(12) United States Patent
Huber (10) Patent No.: US 10,853,094 B2
(45) Date of Patent: Dec. 1, 2020

(54) DYNAMICALLY DOWNLOADABLE DISTRIBUTED DATA DEDUPLICATION LIBRARY

(71) Applicant: EMC IP HOLDING COMPANY LLC, Hopkinton, MA (US)

(72) Inventor: Andrew Robert Huber, Chapel Hill, SC (US)

(73) Assignee: EMC IP Holding Company, LLC, Hopkinton, MA (US)

(*) Notice: Subject to any disclaimer, the term of this patent is extended or adjusted under 35 U.S.C. 154(b) by 67 days.

(21) Appl. No.: 16/167,801

(22) Filed: Oct. 23, 2018

(65) Prior Publication Data

US 2020/0125375 A1    Apr. 23, 2020

(51) Int. Cl.

| G06F 15/16 | (2006.01) |
| G06F 9/445 | (2018.01) |
| H04L 29/08 | (2006.01) |
| H04L 29/06 | (2006.01) |
| G06F 8/60 | (2018.01) |
| G06F 16/182 | (2019.01) |
| G06F 16/174 | (2019.01) |

(52) U.S. Cl.
CPC ............ G06F 9/44536 (2013.01); G06F 8/60 (2013.01); G06F 16/1748 (2019.01); G06F 16/182 (2019.01); H04L 67/2814 (2013.01); H04L 67/40 (2013.01); H04L 67/42 (2013.01)

(58) Field of Classification Search
CPC .............. G06F 9/44536; G06F 16/182; G06F 16/1748; G06F 8/60; H04L 67/2814; H04L 67/40; H04L 67/42
USPC .................................................. 709/203, 227
See application file for complete search history.

(56) References Cited

U.S. PATENT DOCUMENTS

| 5,459,867 | A | * | 10/1995 | Adams | .................. G06F 9/4843 710/63 |
| 6,519,767 | B1 | * | 2/2003 | Carter | ..................... G06F 9/449 717/140 |
| 7,689,999 | B2 | * | 3/2010 | Garms | ..................... G06F 8/71 718/104 |
| 10,339,303 | B2 | * | 7/2019 | Mehta | ..................... G06F 21/52 |
| 2005/0193137 | A1 | * | 9/2005 | Farnham | ................. H04L 69/32 709/230 |

(Continued)

*Primary Examiner* — David R Lazaro
*Assistant Examiner* — Mariegeorges A Henry
(74) *Attorney, Agent, or Firm* — Barry N. Young (57) ABSTRACT

In a distributed data processing and deduplication system comprising a plurality of clients and servers, a traditional client library on each client is replaced by a small kernel library and a separate client library which may be either on the client or on a separate server. The kernel library receives an initialization API call from an application on the client, determines the appropriate version of the client library for that application, and directs the initialization call to that client library. The client library returns to the kernel library a list of function pointers to code that implements functions called by the application, and dynamically redirects function API calls from the application to the code. By storing the client library at one central location and updating that one version for changes to hardware and software, multiple client systems may be updated automatically upon initialization to use the new version of the client library.

18 Claims, 6 Drawing Sheets

(56) References Cited

U.S. PATENT DOCUMENTS

2006/0005078 A1* 1/2006 Guo .................. G06F 11/3636
714/38.11
2014/0244812 A1* 8/2014 Chen .................. G06F 9/44536
709/221

* cited by examiner

DYNAMICALLY DOWNLOADABLE DISTRIBUTED DATA DEDUPLICATION LIBRARY

BACKGROUND

This invention relates generally to large multi-client distributed data processing and storage systems, and more particularly to deduplicated data storage in such large multi-client distributed systems.

There are various protocols for performing distributed data processing and storage in large data processing and storage systems. One particularly advantageous protocol is DD Boost, a protocol offered by Data Domain, a subsidiary of Dell Technologies, Inc., the assignee of this invention, for performing distributed deduplication of user data sent from a client application to a Data Domain server for persistent storage. With DD Boost, an application on a client calls client library application programming interfaces (APIs) that make remote procedure (RPC) calls to the Data Domain server. Client side library code cooperates with server side code to perform distributed deduplication of user data to minimize the data that is actually sent to the server and to minimize the physical storage required to store the data. The architecture splits Boost into separate components, one on the client system and one on the server system. Because the Boost architecture comprises separate components of an application library, difficulties are created when either component must be changed or updated. Similar problems are encountered with other distributed data processing protocols.

One such problem occurs in updating the client library when the server side code is updated. New server side code may require corresponding changes in client side library code. For example, adding a new feature on the server will require new code in the client library code to access the new feature. For applications to take advantage of the new feature means a new client library version must be provided to the applications even if the library changes are invisible to applications. Because applications are often closely tied to a specific library version, releasing a new library version may also require releasing a new version of the application, which may require considerable time. Users must then obtain and install the new version of the application with the new library on each one of all of their client systems. There may be hundreds or even thousands of client systems that must be updated, and this is typically a resource-intensive and time-consuming process. A similar problem can also occur when new server hardware requires client side code changes in order to work with the new server hardware. Users cannot utilize the new hardware until new versions of the applications are available.

A similar problem occurs when a bug fix, performance improvement, or another change requires modifications to the client side library when no server changes are needed. A new client library must be provided to application vendors to incorporate into a new version of the application. The updated application must then be distributed to customers and installed on all affected client systems.

Other problems arise when server code is updated even though no client code changes are required. As multiple server updates occur, eventually the client side library will no longer be supported for use with the new server version of the code. Supporting older clients with new server versions requires extensive qualification and regression testing to ensure all functions and features continue to work correctly. To avoid this problem, compatibility may be supported for only one or two previous and for future versions. Customers wishing to upgrade servers to a newer server version may be forced to also upgrade their applications is order to satisfy compatibility constraints.

There is a need to provide approaches for use with large distributed data deduplication processing and storage systems that avoid the foregoing problems of efficiently and quickly upgrading hardware and software of multiple clients and servers and other problems associated with such systems, and it is to these ends that the invention is directed.

DESCRIPTION OF PREFERRED EMBODIMENTS

The invention is especially adapted for use with the DD Boost of Data Domain for performing distributed deduplication of user data sent from a client application to a Data Domain server for persistent storage in large data processing and storage systems having multiple clients and servers, and it will be described in that context. As will be appreciated, however, the invention is also applicable to other types of distributed data processing systems, and may be used with great utility in such other systems.

Figure 1:
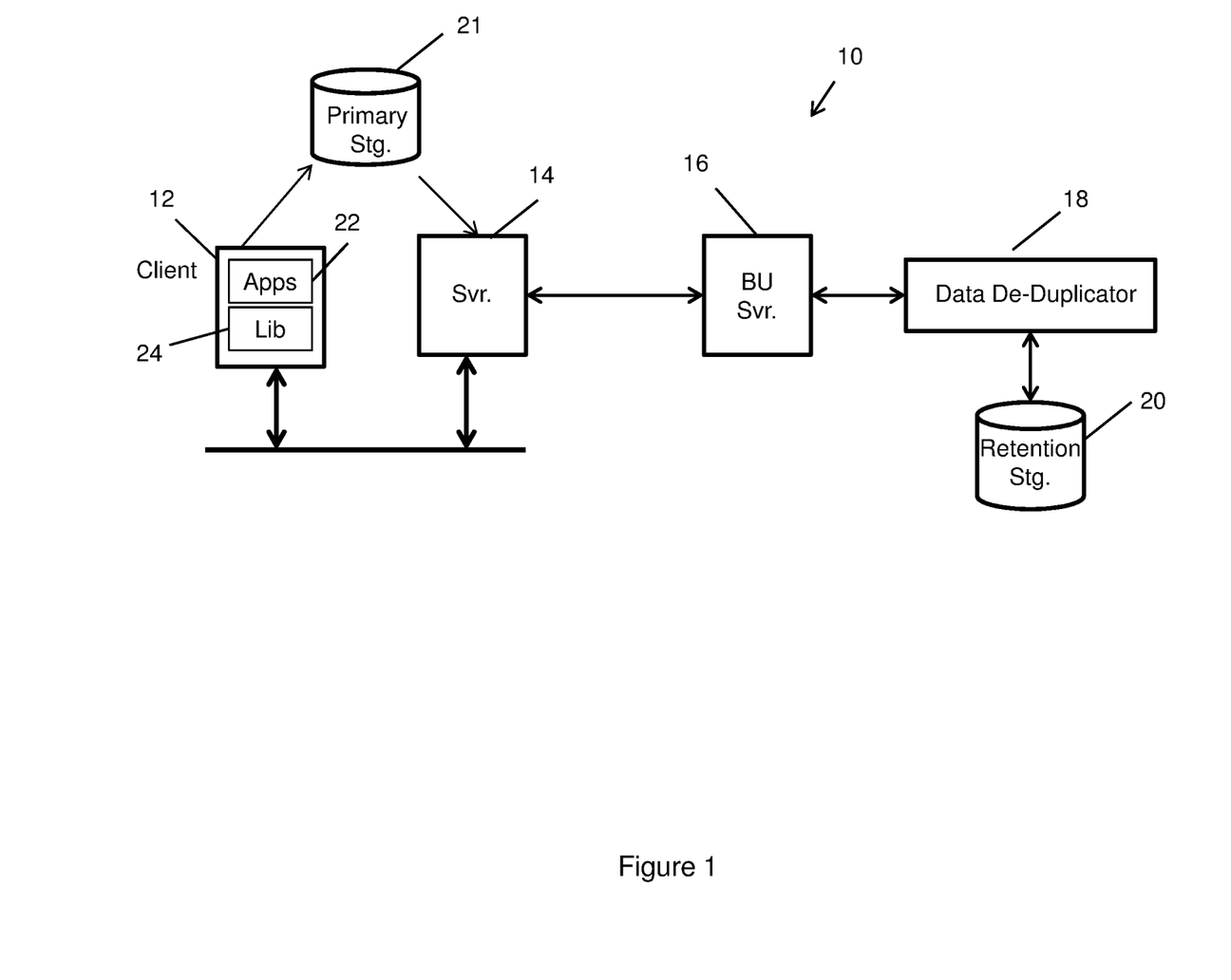
FIG. 1 is a functional block diagram of a distributed data deduplication processing and storage system of the type with which the invention may be employed.

FIG. 1 illustrates functionally a distributed data deduplication processing and storage system 10 of the type with which the invention may be employed. System 10 may comprise a large number of distributed clients 12 (only one being shown in the figure), a large number of servers 14 (one being shown), one or more backup servers 16, one or more data deduplicators 18, which in a preferred embodiment may be Data Domain appliances hosting DD Boost, and retention storage 20 and primary storage 21 which may be on-site storage, for instance. The system 10 may be part of a larger distributed system connected to a wide area network and to archive storage (not shown). Client 12 may host one or more applications 22 which issue API function calls to an application library 24 hosted on the client system 12, as will be described in more detail later. Client 12, servers 14 and 16 and data deduplicator 18 may all comprise computer processors and non-transitory computer-readable media embodying instructions for controlling the processors to perform the operations described herein.

Figure 2:
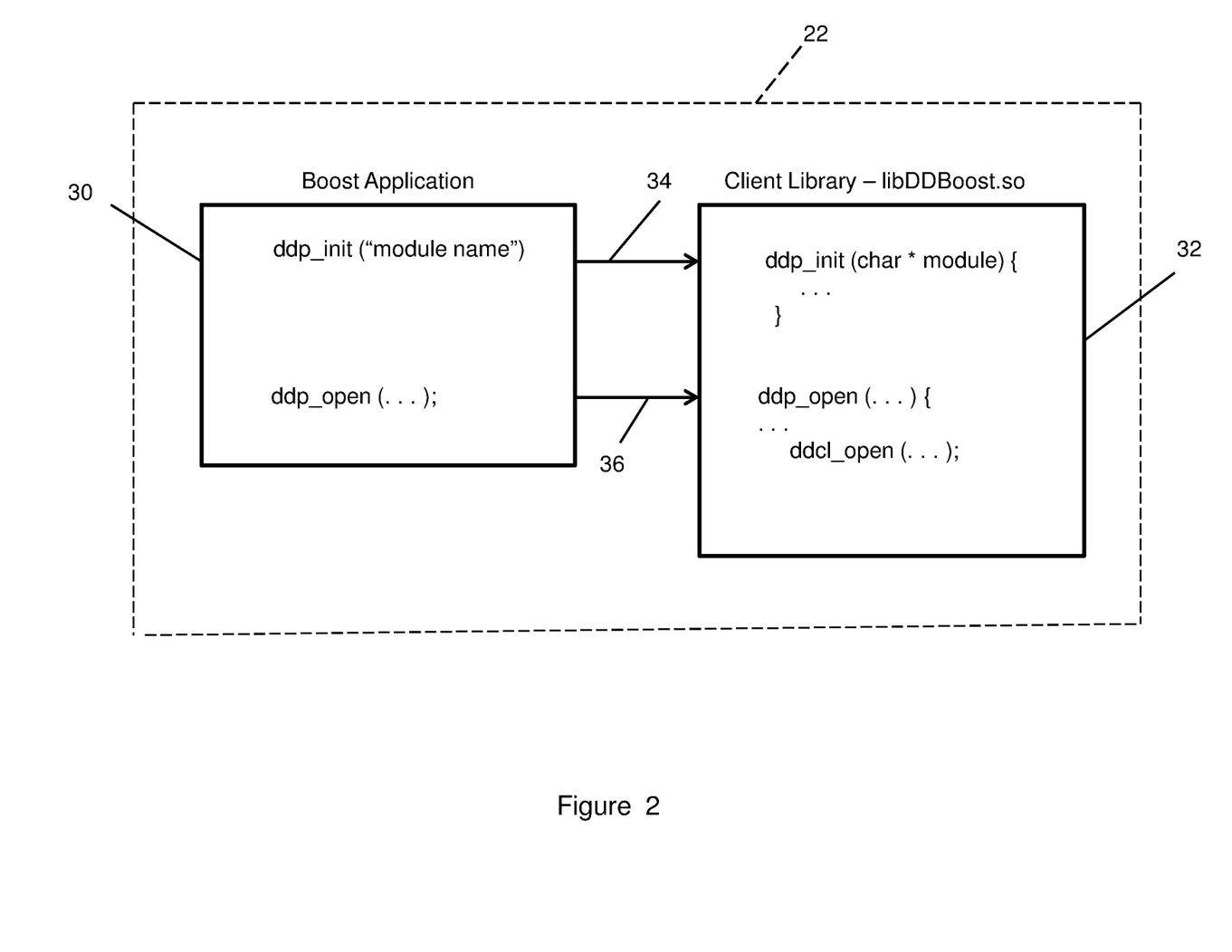
FIG. 2 is a functional diagrammatic view of a known client system embodying applications and an associated client library receiving application calls to invoke functions corresponding to the calls.

FIG. 2 illustrates an embodiment of client system 12, which may host a Boost compatible application 30 and Data Domain's DD Boost client library ("libDDBoost.so") 32 for receiving calls from application 30 to access the functions of the DD Boost distributed deduplication protocol. The current DD Boost client library 32 is a single client-side library, as shown, that comprises middleware which provides services beyond those services which the client operating system provides to applications, such as application 30, that are hosted on the client. The first API call 34 that an application 30 makes to the client library 32 must be to an initialization routine, i.e., ddp_init ("module name"), where the parameter "module name" is the name of the calling application and is used for identification of the calling application. This API initializes various structures in the Boost client library 32 needed for subsequent operations. Following initialization, other calls, e.g., ddp_open ( . . . ), 36, may be made to open, create, write and read files, etc., as shown in the figure. These calls invoke the corresponding implementation in the Boost client library 32. Although FIG. 2 illustrates a DD Boost environment, and although the illustrative code shown is for DD Boost, it will be appreciated that the environment shown in the figure is also representative of other environments which may be similar to and may operate similarly to DD Boost.

Figure 3:
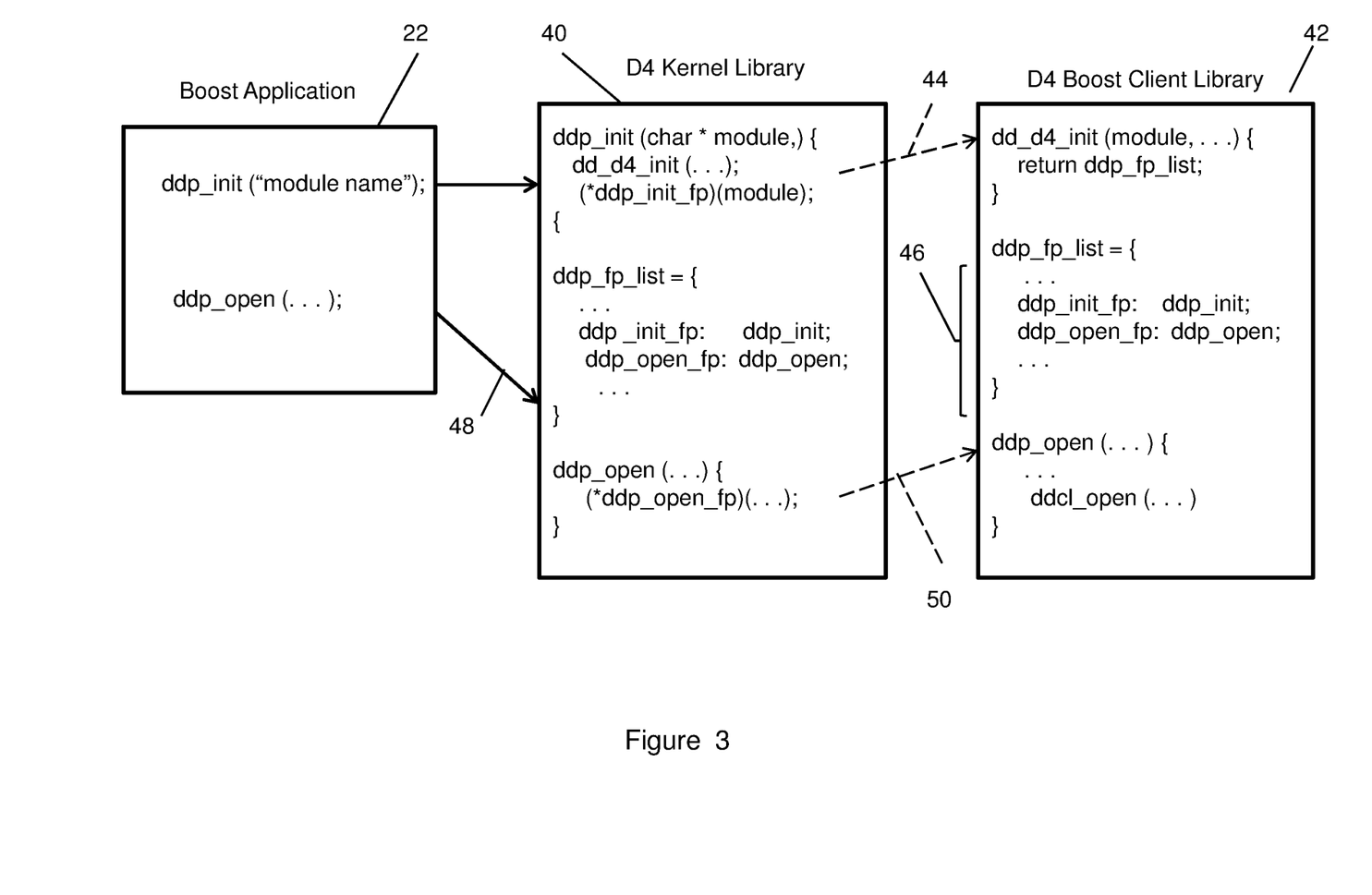
FIG. 3 is a functional diagrammatic view of an embodiment of a new separated two-component client application library system and arrangement in accordance with the invention for splitting the library functionality for handling client application function calls.

In accordance with an embodiment of the invention, as shown in FIG. 3 the invention implements the client library architecture in a new and different way from conventional DD Boost. As shown in FIG. 2, in an embodiment the invention replaces the single client library 30 with two different library components. One component may comprise a small library referred to as a D4 Kernel Library, 40, that resides on the client and embodies an initialization routine. The other component of the library referred to herein as a D4 Boost Client Library, 42, may reside on the client 12 or elsewhere, as on a server such as server 14, for example. The D4 Boost Client Library 42 comprises a modified version of the standard Boost client library. The D4 Boost Kernel includes logic to determine the appropriate version of the Client Library to use, as will be described below. When an application 22 invokes Boost via the standard ddp_int API, the call is handled by the D4 Kernel 40 which determines the version of the D4 Client Library that should be used, and its location. The kernel may do this, for example, by connecting to a predetermined site to see if there is a more recent version of the D4 Boost Client Library for use with the initializing application or client, and, if so, downloading that more recent version to replace the existing version. Once the appropriate Client Library is determined, the D4 Kernel may invoke at 44 the appropriate initialization routine to initialize that Client Library. This is shown by the Kernel calling (at 44) dd_d4_init (module, . . . ) in the D4 Boost Client Library 42. Adding this initialization routine is the only change to a standard Boost library required by the invention, although, as will be described below, other changes may be made to the standard library to accommodate new hardware or updates and changes to hardware, software or applications.

As described below, after initialization, the D4 Kernel 40 serves as a redirection layer that passes Boost API calls from the application 22 to the standard Boost Library 42. During its initialization, the D4 Kernel Library 40 invokes the new dd_d4_init routine in the Client Library 42. This causes the D4 Boost Client Library 42 to create and return (at 46) a vector of function pointers, as ddp_fp_list={ . . . }, with one function pointer entry for each of the standard Boost APIs pointing to computer code in the D4 Boost Client Library for performing the corresponding function. The D4 Kernel Library saves the list of function pointers and use the returned function pointer to the ddp_init routine in the Client Library to invoke that routine for the appropriate D4 Boost Client Library initialization. When the D4 Boost Client Library responds to the ddp_init call and returns control to the D4 Kernel, the D4 Kernel ddp_init routine returns to the application. All further Boost API calls made by the application go to the D4 Kernel Library, as illustrated by the ddp_open call 48 in FIG. 3. The D4 Kernel effectively acts as a redirection mechanism passing the call through to the Boost Client library that was discovered and connected to the application by the original ddp_init call by using the returned pointers, as shown at 50.

With this redirection mechanism, the D4 Boost Client side code is no longer constrained to use only the version of the D4 Boost Library that may be currently in place on the client system 12. Rather, removing this restriction allows the client to determine which version of a Boost library to use by the initialization routine in the new Boost D4 Kernel Library component. As will be described, this affords the flexibility to have rules, for instance, determine where to find the appropriate Boost library, or alternatively, to be told via various mechanisms, as will be described, where to obtain the appropriate library. A combination of these two approaches may also be used.

Advantageously, once determined the specified D4 Boost Client Library may either be used in place, or dynamically downloaded to the client system or to another location during initialization. Furthermore, since the D4 Boost Client Library may be hosted at one central location from which it may be used or dynamically downloaded to client systems, the D4 Boost Client Library may be easily updated or changed once at that central location to accommodate new or upgraded hardware or software or application changes, and the updates and changes to the D4 Boost Client Library may be automatically downloaded to multiple clients upon initialization. This upgrades the D4 Boost Client Library dynamically and automatically on each of multiple clients, thereby avoiding the difficulties and resources otherwise needed to upgrade hundreds or thousands of client systems in large distributed systems.

Figure 4:
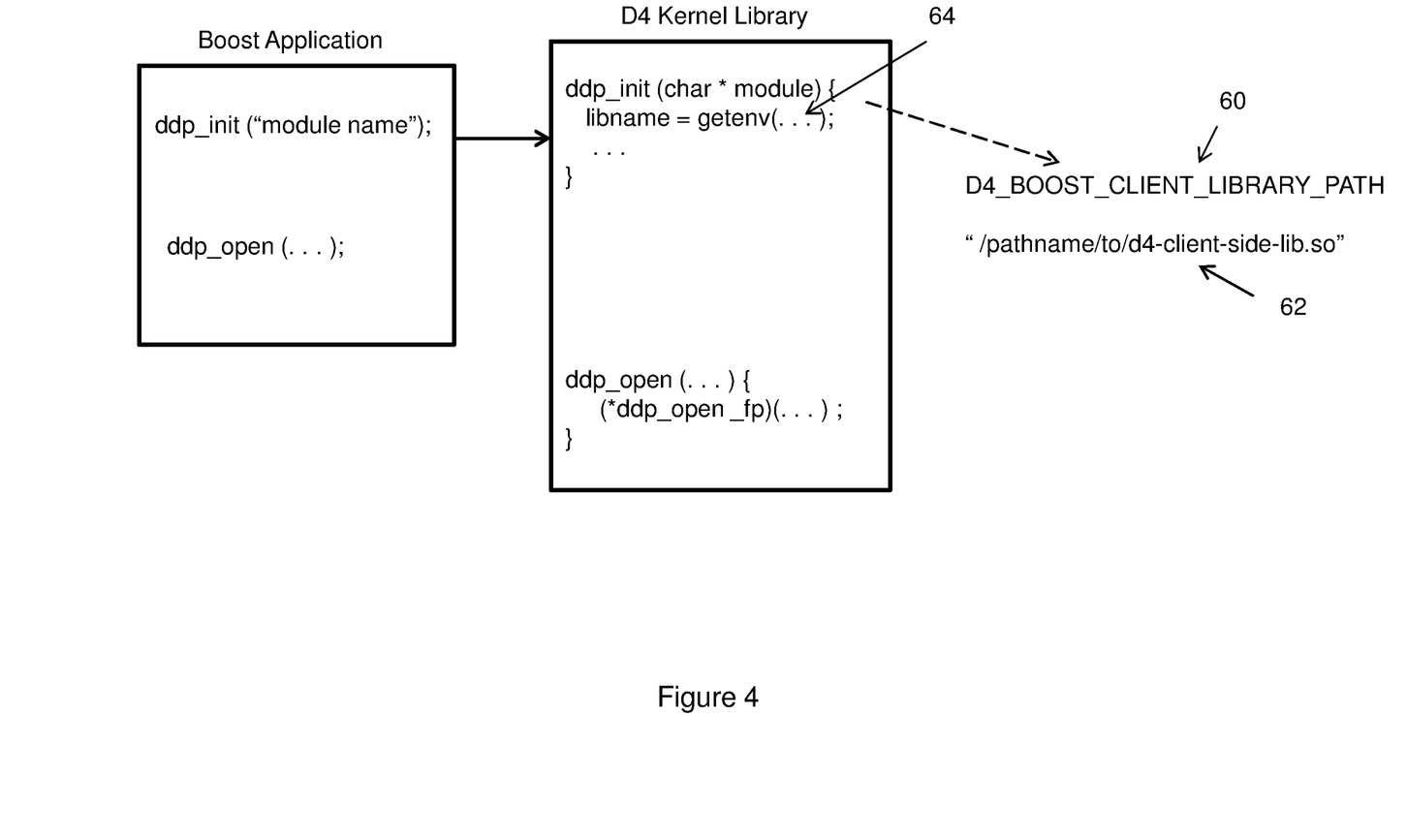
FIG. 4 is a functional diagrammatic view of a modification of the system of FIG. 3 illustrating an example of a method of using an environment variable to redirect application calls to an appropriate library.

FIG. 4 illustrates one embodiment of a method in accordance with the invention where the D4 Kernel can be informed of the appropriate client library to use. This approach uses an environment variable that may be set up and defined on each client by a user. This may be done the first time D4 Boost is used on each client machine, and the environment variable may point to a predetermined location where the new D4 Boost Client Library may be located, e.g., "libDDBoost-d4.so". Thereafter, any changed Client Library may always be at the same location so that clients do not have to be individually updated with a new location.

The method illustrated in FIG. 4 employs an environment variable named D4_BOOST_CLIENTLIENTLIBRARY_PATH, 60, to designate the pathname ("/pathname/to/d4-client-side-lib.so") 62 of the appropriate library to use. This may be done by including in the D4 Kernel Library as part of the initialization routine code (libname=getenv( . . . );), 64, that obtains the appropriate environment variable and library using the indicated pathname, as shown. This illustrates an approach which enables the D4 Kernel to determine which client library and which version of that library to use. Since a pathname is specified by the environment variable, this pathname could specify either a local or a remote file, including a file in a shared or remote file system accessed from the client system by a standard file system protocol such as NFS or CIFS. Furthermore, it will be appreciated that there are many other ways the user or the application could inform the D4 Kernel which standard library to use, such as, for example, by data in a configuration file, an additional parameter or call, etc. If the file is remote, it may be downloaded to the client or a local server, for instance, and run from that location.

Figure 5:
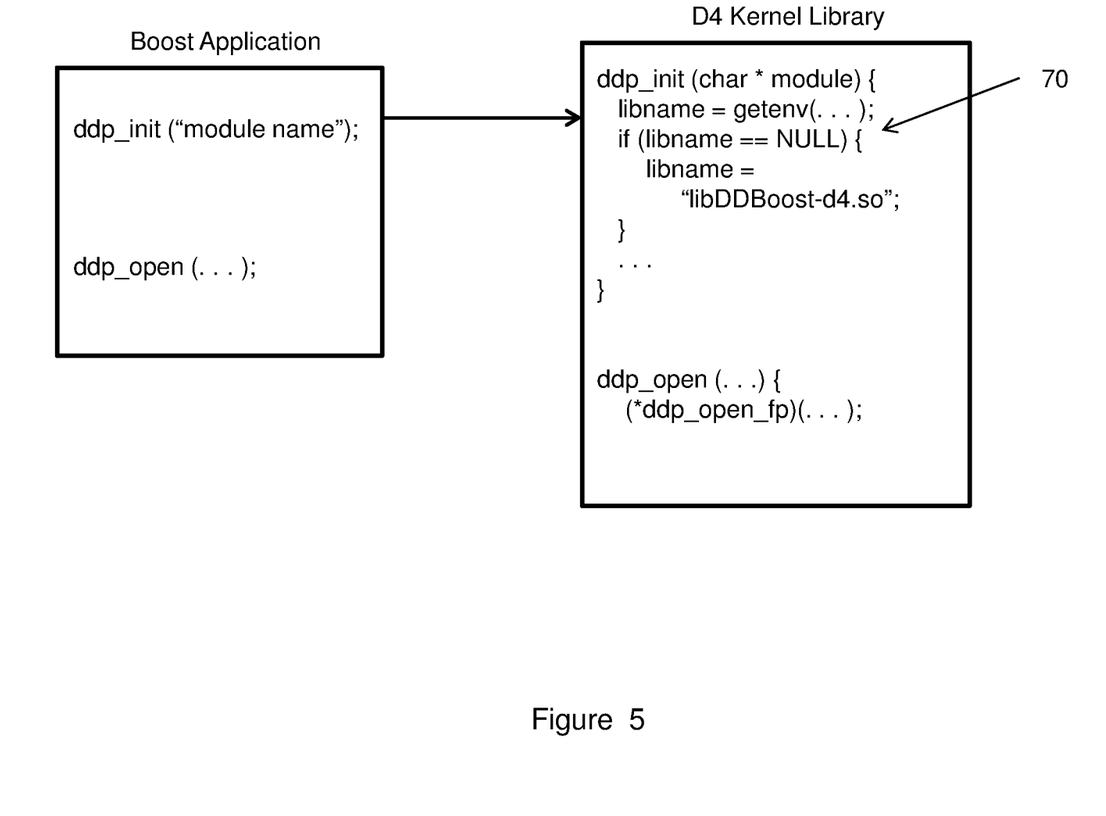
FIG. 5 is a functional diagrammatic view of a further modification of the system of FIG. 4 using rules for designating the client library to use for application calls.

As illustrated In FIG. 5, if the environment variable has not been defined by the user, or if the specified file does not exist or cannot be accessed, e.g., "if (libname==NULL)", then the D4 Kernel may resort to one or more predetermined rules to determine the appropriate client library to use. There may be a rule, for example, that if "NULL" is returned, the client is to look for a default standard library named, e.g., "libDDBoost-d4.so", as shown at 70, in the current working directory. If it is found, it may be used. Otherwise an error may be returned since the needed standard library cannot be found.

Figure 6:
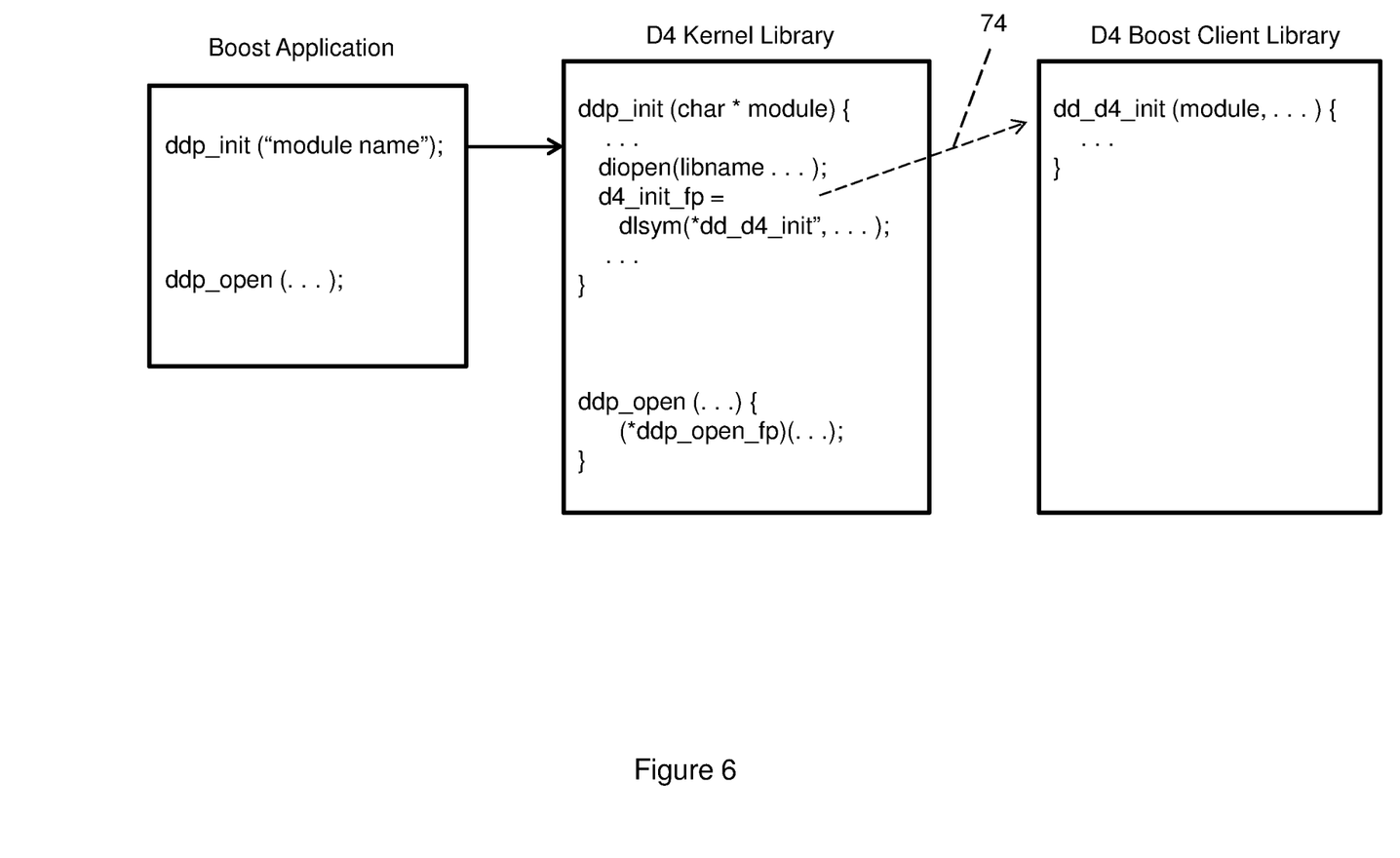
FIG. 6 is a functional diagrammatic view of the opening and invocation of a client library.

FIG. 6 illustrates an embodiment of a method to locate a new D4 initialization routine "dd_d4_init" in the standard library. The approach shown issues a call dlsym(*dd_d4_init", . . . ) and uses the function pointer that is returned, as shown at 74, to call the new dd_d4_init routine. Upon initialization the results may be passed back to the application. After initialization, the D4 Kernel redirects all API calls through to the D4 Boost Client Library using the function pointers returned during initialization.

When a client update is required to match a new server version, the required new D4 Client Library can be loaded automatically by the already in place D4 Kernel. The user needs merely to specify to the D4 Kernel the pathname of the new library. Alternatively, a built in rule could tell the D4 Kernel to look in a standard "release directory" on the server system where the latest D4 Kernel would be available. When only a new Client Library is needed, it may be obtained as described above. The user may use an environment variable to specify the location of the new Library, which may be local, remote, on the DD Deduplicator in a standard location, or otherwise located using a default built-in rule.

From the foregoing it will be appreciated that the invention affords a number of advantages over current approaches. Separating a single client side library into two libraries with a small Kernel Library version serving as a redirection layer to a larger standard Client Library is particularly advantageous in addressing the problems described above of dynamically, automatically and efficiently updating multiple clients or servers during initialization to accommodate new hardware and software. The Kernel Library may decide during an application's initialization of the Boost libraries which standard library version to use and where to obtain it, which allows different applications to initialize different libraries. While updating software automatically is common with browsers and operating systems, it is not so with middleware such as application libraries because an application usually determines the library it must use. The invention now permits such flexibility with application libraries.

While the foregoing has been with reference to particular embodiments of the invention, it will be appreciated by those skilled in the art that changes may be made to these embodiments without departing from the principles of the invention, which are defined in the appended claims.

The invention claimed is:

1. A method of distributed processing and data deduplication in computer system having a client hosting an application, and having one or more servers for deduplicating data from said client and for retention storage, comprising:

receiving by a kernel library on said client an initialization API call from said application to initialize a client library for said application;

determining by said kernel library in response to said initialization API call an appropriate version of said client library for said application and a location of said appropriate version of said client library, said determining comprising identifying said appropriate version of said client library and the location of a particular server in said computer system that hosts said appropriate version of said client library, said location being remote from said client and from said kernel library;

returning to said kernel library by said appropriate version of said client library pointers to computer code on said particular server for redirecting API function calls from said application to said computer code on said particular server, said computer code being formed to cooperate with said application to minimize data that is transferred from said client for deduplication and storage; and redirecting by said kernel library using said pointers said API function calls from said application to said computer code for said cooperation to minimize said data transfer.

2. The method of claim 1, wherein said determining comprises the kernel library identifying said client library using one or more predefined environment variables that specify a pathname of said client library on said particular server.

3. The method of claim 1 further comprising downloading said appropriate version of said client library to said server of said system, and redirecting said API function calls from said application to said client library on said server.

4. The method of claim 1, wherein said client hosts a plurality of different applications, and said determining comprises determining a different version of a client library for different ones of said applications.

5. The method of claim 1, wherein said determining comprises identifying said appropriate version of said client library using one or more rules in said client.

6. The method of claim 1 further comprising storing said pointers in said kernel library, and using said pointers for future API function calls.

7. The method of claim 1 further comprising dynamically downloading and using an updated version of said client library by said client in response to either an updated version of said client library or an updated version of said application.

8. A distributed data deduplication and retention storage system, comprising:

a plurality of distributed clients, each hosting a software application for processing data in said system; and a plurality of distributed servers performing deduplication and storage of said data from said clients; and wherein each client comprises a kernel library on said each client adapted to identify an appropriate version and a location of a client library for use by said software application and to direct an API call from said application to said client library;

said client library comprising middleware that is hosted on a server remote from said kernel library and said each client and that is formed to return to said kernel library pointers to computer code for use by said kernel library to redirect API function calls from said application to said computer program code, said computer code being formed to cooperate with said application to minimize data that is transferred from said client for deduplication and storage.

9. The system of claim 8, wherein said kernel library on each said client is formed to identify said client library using one or more environmental variables that specify a pathname of said client library to said particular server, and to issue an initialization call using an environmental variable to initialize said client library for said software application hosted by said client.

10. The system of claim 8, wherein each said kernel library on said client is formed to store said application function pointers returned by said initialized client library for use in performing said functions.

11. The system of claim 8, wherein said client is formed to store said initialized client library.

12. Non-transitory computer readable media embodying executable instructions for controlling the operation of a computer to perform a method of distributed processing and data deduplication for retention storage in a computer system having a client hosting an application, and having one or more servers for processing and deduplicating data from said client for said retention storage, comprising:

receiving by a kernel library on said client an initialization API call from said application to initialize a client library for said application;

determining by said kernel library in response to said initialization API call an appropriate version of said client library for said application and a location of said appropriate version of said client library, said determining comprising identifying said appropriate version of said client library and the location of a particular server in said computer system that hosts said appropriate version of said client library, said location being remote from said client and from said kernel library;

returning to said kernel library by said appropriate version of said client library pointers to computer code on said particular server for redirecting API function calls from said application to said computer code on said particular server, said computer code being formed to cooperate with said application to minimize data that is transferred from said client for deduplication and storage; and redirecting by said kernel library using said pointers said API function calls from said application to said computer code for said cooperation to minimize said data transfer.

13. The non-transitory computer readable media of claim 12, wherein said determining comprises the kernel library identifying said client library using one or more predefined environment variables that specify a pathname of said client library on said particular server.

14. The non-transitory computer readable media of claim 12 further comprising downloading said appropriate version of said client library to said particular server of said system, and redirecting said API function calls from said application to said client library on said particular server.

15. The non-transitory computer readable media of claim 12, wherein said client hosts a plurality of different applications, and said determining comprises determining a different version of a client library for different ones of said applications.

16. The non-transitory computer readable media of claim 12, wherein said determining comprises identifying said appropriate version of said client library using one or more rules in said client.

17. The non-transitory computer readable media of claim 12 further comprising storing said pointers in said kernel library, and using said pointers for future API function calls.

18. The non-transitory computer readable media of claim 12 further comprising dynamically downloading and using an updated version of said client library by said client in response to either an updated version of said client library or an updated version of said application.

* * * * *